United States Patent [19]

Singer

[11] 4,442,721
[45] Apr. 17, 1984

[54] MOISTURE AND CONSISTENCY SOIL SAMPLER

[76] Inventor: Laura G. Singer, 221 Riverview Ave., Highland Park, N.J. 08904

[21] Appl. No.: 405,879

[22] Filed: Aug. 6, 1982

[51] Int. Cl.³ .............................................. G01N 1/08
[52] U.S. Cl. ................................ 73/863.31; 73/864.51
[58] Field of Search .......... 73/863.31, 864.51, 864.64; 175/20, 58, 77

[56] References Cited

U.S. PATENT DOCUMENTS

| | | | |
|---|---|---|---|
| 3,080,760 | 3/1963 | Pierma | 73/863.31 |
| 3,091,968 | 6/1963 | Platzer | 73/863.31 |
| 3,109,307 | 11/1963 | Papworth | 73/864.51 |
| 4,252,200 | 2/1981 | Peterson | 73/864.64 |

Primary Examiner—S. Clement Swisher
Attorney, Agent, or Firm—Daniel H. Bobis

[57] ABSTRACT

A moisture and soil sampler comprising a shaped elongated member having an insertable end and a handle end remotely located from the insertable end, a plurality of serially spaced transverse surfaces and a plurality of generally concave recessed surfaces in cooperative association with the transverse surface to define collecting pockets, a shaped tip for deflecting roots incident to insertion, and shaped sides of the collecting pockets to facilitate soil collection and manipulation of the sampler without harm to plant roots.

2 Claims, 8 Drawing Figures

MOISTURE AND CONSISTENCY SOIL SAMPLER

BACKGROUND OF THE INVENTION

This invention relates generally to horticultural and agronomy moisture and consistency soil sampling tools and more particularly to a simple, low cost, hand held tool suitable for domestic potted plants and flower beds where moisture and other conditions of the soil are totally or partially humanly controlled. Watering of house plants and/or other sheltered plants by natural rain may be impossible or inadequate under particular situations and loss of moisture due to natural consumption by the plant, natural evaporation, or accelerated evaporation resulting from dehumidification or air conditioning mandates that the moisture content and soil condition be carefully and continuously monitored in order to maintain maximum plant health. Additionally, the moisture and soil conditions vary with depth of soil as a function of surrounding air, moisture absorptivity of the potting vessel, and density of the root system.

Those skilled in the art will recognize that periodic sampling without destruction of the plant's root system is essential to protect the plant's delicate root system and to maintain adequate soil conditions, particularly moisture. It is also essential that such a tool be easy to use and simple to clean.

The prior art reveals various types of penetrating sampling devices. U.S. Pat. No. 158,985 to Shultz discloses a pointed cotton auger having sides with teeth shaped therein which would sever plant roots upon entry, shred and uproot them upon exit, and leave without having recovered a soil sample. U.S. Pat. No. 230,121 to Frost for a grain sample, discloses a series of cavities which are filled simultaneously by grain upon the opening of a movable section of a peripheral wall. Such a device would be ineffectual in a relatively solid mass such as potting soil and would be rendered equally inoperative from clogging by soil grains and root fibers. Other devices, such as those disclosed in U.S. Pat. Nos. 2,072,165; 2,544,728; 3,091,969; 3,597,980; and 4,252,200 display similar structural elements which would either disturb the root system or be suitably inoperative in a soil medium if carried out in the manner intended for the herein disclosed invention.

The present invention seeks to provide a simple, low cost, hand held moisture and consistency soil sampler suitable for a wide range of horticultural and agronomy sampling situations where entry and exit for sampling at various depths must be able to be achieved without disturbing existing root systems.

These objectives are accomplished in the present device by an elongated member having an insertable end with a plurality of serially located recessed pockets for collecting soil at various depths, a handle end for applying pressure to insert and manipulate the elongated member in the soil, and a shaped tip disposed to deflect root elements as the sampler is forced into the soil.

SUMMARY OF THE INVENTION

Thus, the present invention covers a moisture and consistency soil sampler for determining the moisture content and other conditions of subsurface soil, as for example in inside potted house plants or flower beds comprising, a shaped elongated member having a shaped end for insertion into the soil and a handle end, adjacent the insertable end of the elongated member are a plurality of serially spaced transverse soil collecting pockets generally defined by two transverse surfaces and a recessed surface of generally concave shape, the spaced pockets each have sides shaped to facilitate collection of samples by in place manipulation of the sampler and removal thereof from the ambient location being tested.

Accordingly, it is an object of the present invention to provide a relatively simple and low cost moisture and consistency soil sampler for collecting samples of soil located at various depths.

It is another object of the present invention to provide a moisture and consistency soil sampler which can be inserted and manipulated to collect a sample and thereafter be removed without deleterious effect to plant root systems.

It is another object of the present invention to provide a moisture and consistency soil sampler with sample collection pockets which can be easily, quickly and effectively emptied and cleaned.

Other objects and advantages of the invention including the basic design and nature of the improvements therein will appear from the following description taken in conjunction with the accompanying drawings, in which:

DESCRIPTION OF THE DRAWINGS

FIG. 7 is a cross-sectional view taken on line 7—7 of FIG. 1.

FIG. 8 is a cross-sectional view taken on line 8—8 of FIG. 1 showing the collecting pockets of the moisture and consistency soil sampler shown in FIG. 1.

PREFERRED EMBODIMENT

Figure 1:
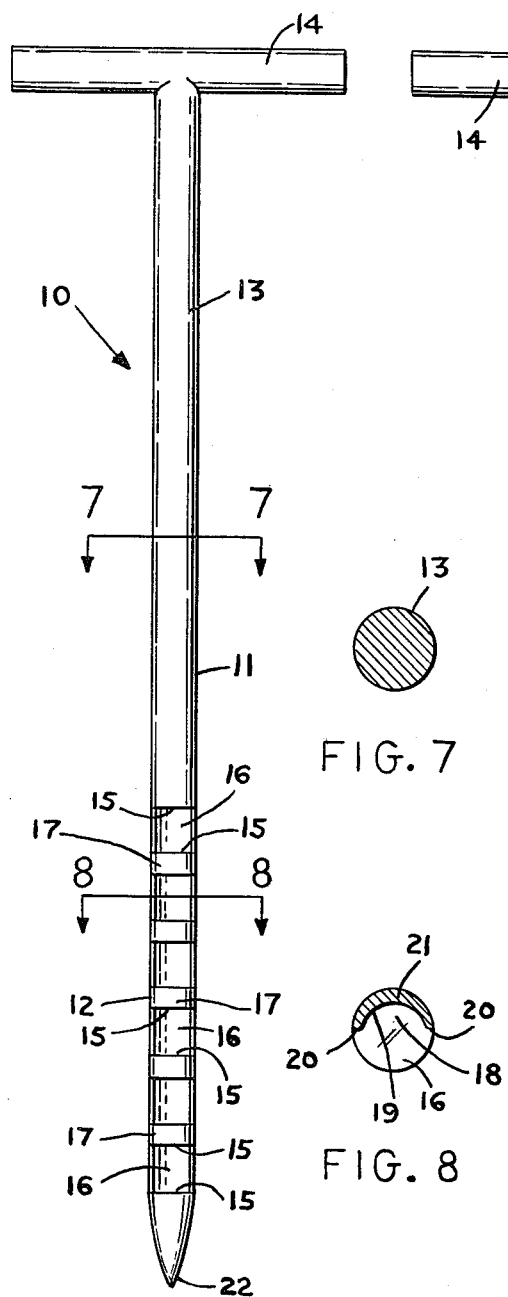
FIG. 1 is a front view of the moisture and consistency soil sampler.
Figure 4:
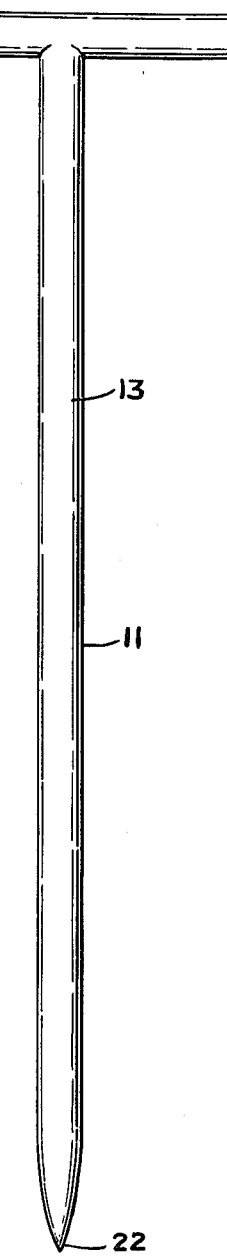
FIG. 4 is a back view of the sampler shown in FIG. 1.
Figures 5, 6:
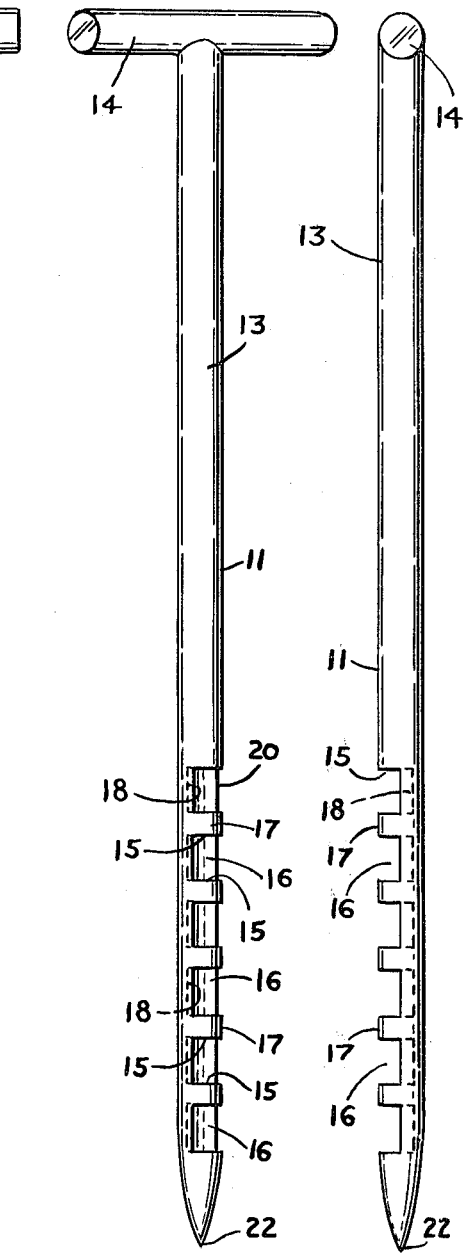
FIG. 5 is a forty-five degree left side view of the soil sampler shown in FIG. 1.
FIG. 6 is a right side view of the soil sampler shown in FIG. 1.
Figure 2:
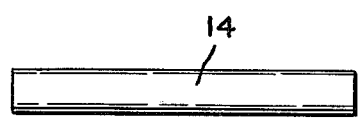
FIG. 2 is a top view of the soil sampler shown in FIG. 1.
Figure 3:
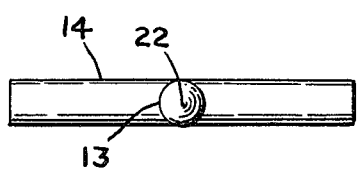
FIG. 3 is a bottom view of the soil sampler shown in FIG. 1.

Referring now to the drawings, FIG. 1 shows the moisture and consistency soil sampler, generally designated 10, having an elongated member 11 with an insertable end 12 and a handle 13 remotely located from the insertable end 12. The handle end 13 may terminate in a variety of configurations suitable for applying entry pressure by hand and a twisting motion to the elongated member 11 and is illustrated herein by a handle member 14 transverse to the extremity of the handle end 13 of the elongated member 11. The length of the elongated member 11 may be varied depending on the depth of soil to be tested, for example a size complementary for use with common flower pot sizes of depths of planting domestic flower bulbs as those familiar with horticulture and agronomy can readily appreciate.

The diameter of the elongated member 11 should be generally proportionate to its length to maintain the necessary stiffness required for insertion and twist for gathering a sample. Consistent with the materials of fabrication, for example, an 11" elongated member might have a diameter of ⅜".

The moisture and consistency soil sampler can be fabricated by any of various methods such as stamping, mold injection, extrusion and light machining or other processes that can achieve the required shape and strength, as are familiar to those skilled in the fabrication arts. Any material capable of maintaining its structural strength during insertion and withdrawal which is not harmfully reactant with the soil or the plant is suitable, such as painted wood, aluminum, stainless steel, or any of a variety of plastics such as nylon, delrin and machinable acrylics.

A plurality of serially spaced generally transverse collecting means 15 are located along the elongated member 11 at the insertable end 12 to define soil collecting pockets 16. Spacers 17 are provided along the elongated member 11 between the collecting pockets 16 to add strength to the insertable end 12. The distance between alternate collecting pockets 16 and spacers 17 may vary, for example the collecting pocket may be approximately ⅛" with a spacer of 3/16". As shown in FIG. 8, an associated recess means 18 is formed in communication with the collecting pocket 16 by a generally concave inner surface 19 of elongated member 11 which concave inner surface 19 terminates in shaped edges 20 disposed to collect soil samples without harm to the plant root system. The internal diameter of the concave inner surface 19 may vary with the size and materials of the elongated member 13 with regard to the strength of the walls 21. For example, the embodiment shown in FIG. 8 with a ⅜" diameter elongated member is workable with a concave surface internal radius of 5/32" for a plastic material. Further, the edges of the respective collecting pockets 18 terminate at a point short of the diameter transverse to the axial line of the soil sampler 10.

The insertable tip 22 is shaped to facilitate a clean straight entry into the soil and to continue to the required depth by gently deflecting any roots in the line of insertion to avoid damage by puncture or otherwise.

It will be understood that the invention is not to be limited to the specific construction or arrangement of parts shown but that they may be widely modified within the invention defined by the claims.

What is claimed is:

1. A generally unitary moisture and consistency soil sampler comprising,
  a. a shaped elongated member having, an inserting end, and a handle end remote from the inserting end,
  b. said elongated member having a plurality of serially spaced generally transverse means defining continuously open soil collecting pockets along the elongated member near the inserting end,
  c. each of said means defining the soil collecting pockets including, at least two coacting and spaced transverse surface means to define a spaced opening therebetween for collecting soil in the soil collecting pockets,
  d. said means defining each of the soil collecting pockets also including, a concave shaped section in said shaped elongated member forming an associated recess means for each of the said collecting pockets in communication with the respective spaced opening defined by the transverse surface means, and
  e. each said concave shaped section terminating in substantially diametrically opposed shaped side edges to facilitate collection of soil during use of the moisture and consistency soil sampler.

2. In the soil sampler as claimed in claim 1 wherein, spacer means are provided between each of the plurality of serially spaced transverse means to add strength to the inserting end of the soil sampler.

* * * * *